United States Patent
Campion et al.

(10) Patent No.: US 7,267,766 B2
(45) Date of Patent: Sep. 11, 2007

(54) METHOD AND APPARATUS FOR AERATING A SURFACE LAYER IN A STRATIFIED LIQUID BODY

(75) Inventors: William R. Campion, Portsmouth, RI (US); William J. Donohue, Barrington, RI (US)

(73) Assignee: Pro-Act Microbial, Inc., Warren, RI (US)

( * ) Notice: Subject to any disclaimer, the term of this patent is extended or adjusted under 35 U.S.C. 154(b) by 0 days.

(21) Appl. No.: 10/941,666

(22) Filed: Sep. 15, 2004

(65) Prior Publication Data

US 2005/0087894 A1    Apr. 28, 2005

Related U.S. Application Data

(60) Provisional application No. 60/578,767, filed on Jun. 10, 2004, provisional application No. 60/577,955, filed on Jun. 8, 2004, provisional application No. 60/503,100, filed on Sep. 15, 2003.

(51) Int. Cl.
    *B01F 3/04*    (2006.01)
(52) U.S. Cl. .............. 210/221.2; 210/242.2; 261/120; 261/122.1; 261/122.2
(58) Field of Classification Search ........... 261/120, 261/122.1, 122.2, 124, DIG. 70; 210/220, 210/221.2, 242.2
    See application file for complete search history.

(56) References Cited

U.S. PATENT DOCUMENTS

| | | | |
|---|---|---|---|
| 3,840,216 A | | 10/1974 | Smith et al. |
| 4,215,082 A | * | 7/1980 | Danel ..................... 261/124 |
| 4,287,060 A | * | 9/1981 | Coggins ................. 210/194 |
| 4,415,450 A | | 11/1983 | Wolverton |
| 5,089,179 A | * | 2/1992 | von Nordenskjold ...... 261/81 |
| 5,316,671 A | * | 5/1994 | Murphy .................... 210/220 |
| 5,354,457 A | | 10/1994 | Becchi |
| 5,736,049 A | * | 4/1998 | Bundy et al. ............. 210/620 |
| 5,800,705 A | * | 9/1998 | Downs ..................... 210/177 |
| 5,804,105 A | * | 9/1998 | Allison ................. 261/122.2 |
| 5,906,774 A | * | 5/1999 | Loy ........................ 261/120 |
| 6,071,418 A | | 6/2000 | Tai |
| 6,086,056 A | * | 7/2000 | Leask et al. ............ 261/120 |
| 6,103,123 A | * | 8/2000 | Gantzer ................... 210/605 |

(Continued)

FOREIGN PATENT DOCUMENTS

WO    WO88/07977    * 10/1988

*Primary Examiner*—Scott Bushey
(74) *Attorney, Agent, or Firm*—Pandiscio & Pandiscio

(57) ABSTRACT

A method and apparatus for aerating a surface layer in a stratified liquid body using a depth-adjustable, fine bubble, surface layer aeration unit comprising:
  a body comprising at least one hollow internal structure;
  an air inlet communicating with the at least one hollow internal structure, whereby air from an external air source may be introduced into the at least one hollow internal structure;
  at least one fine bubble aerator communicating with the at least one hollow internal structure, whereby air from the at least one hollow internal structure may be released through the fine bubble aerator into an adjacent fluid; and
  at least one weight pod attached to the body, wherein the at least one weight pod comprises structure for adjusting the weight of the at least one weight pod, whereby the buoyancy of the aeration unit may be adjusted so as to permit the at least one fine bubble aerator to be positioned at a desired depth in a fluid body.

11 Claims, 17 Drawing Sheets

U.S. PATENT DOCUMENTS

| | | |
|---|---|---|
| 6,260,831 B1 | 7/2001 | Jager |
| 6,264,176 B1 | 7/2001 | Dickman et al. |
| 6,361,698 B1 * | 3/2002 | Tai .............................. 210/760 |
| 6,390,456 B1 | 5/2002 | Lee et al. |
| 6,478,964 B1 | 11/2002 | Redmon |
| 6,511,054 B1 * | 1/2003 | Green ..................... 261/122.1 |
| 6,514,410 B1 * | 2/2003 | Gantzer ....................... 210/605 |
| 6,773,595 B2 * | 8/2004 | Gantzer ....................... 210/605 |

* cited by examiner

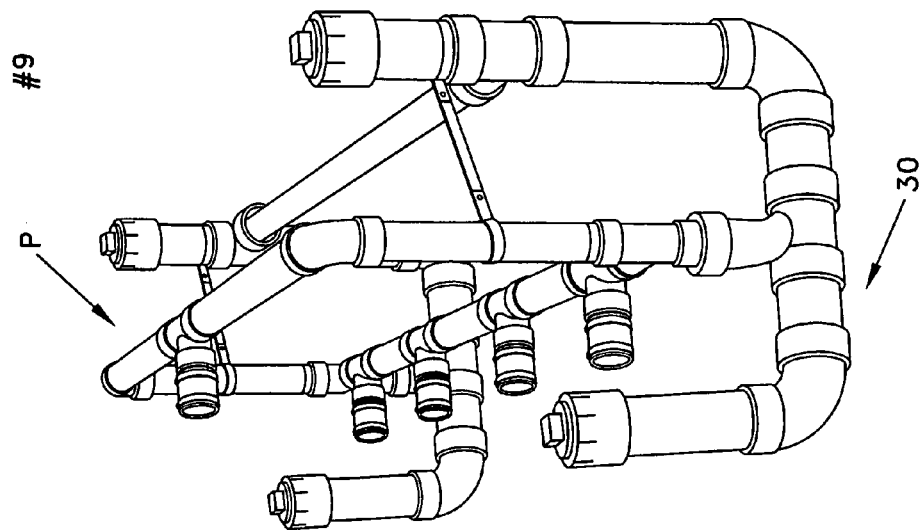
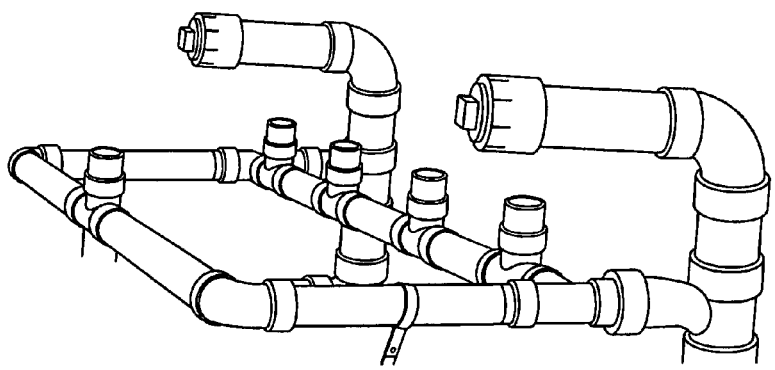
FIG. 14

MOO FINISHED AND READY FOR INSTALLATION

METHOD AND APPARATUS FOR AERATING A SURFACE LAYER IN A STRATIFIED LIQUID BODY

REFERENCE TO PENDING PRIOR PATENT APPLICATIONS

This patent application claims benefit of:
(1) pending prior U.S. Provisional Patent Application Ser. No. 60/503,100, filed Sep. 15, 2003 by William R. Campion for DEPTH-ADJUSTABLE, FINE BUBBLE, LIQUID SURFACE AERATION UNIT;
(2) pending prior U.S. Provisional Patent Application Ser. No. 60/578,767, filed Jun. 10, 2004 by William R. Campion for PRO-ACT MICROBIAL MANURE TREATMENT SYSTEM; and
(3) pending prior U.S. Provisional Patent Application Ser. No. 60/577,955, filed Jun. 8, 2004 by William R. Campion et al. for DEPTH-ADJUSTABLE, FINE. BUBBLE, LIQUID SURFACE AERATION UNIT.

The three above-identified patent applications are hereby incorporated herein by reference.

FIELD OF THE INVENTION

This invention relates to liquid waste treatment systems in general, and more particularly to a method and apparatus for aerating a surface layer in a stratified liquid body.

BACKGROUND OF THE INVENTION

In liquid waste treatment processes, aeration introduces air into standing bodies of waste liquids (e.g., manure lagoons, waste ponds, water ponds and the like), adding fresh oxygen to the liquid and thereby providing an aerobic environment for microbial degradation of organic matter. More particularly, the purpose of this aeration is to supply the required oxygen to the metabolizing microorganisms and to provide mixing so that the microorganisms come into close contact with the dissolved and suspended organic matter, whereby to effect the desired microbial degradation.

Various aeration devices are currently available for aerating a liquid body. However, most commercially-available aeration devices add oxygen to the liquid body by means of propellers or rotors. This can create a problem in some situations, inasmuch as the propellers or rotors tend to generate substantial agitation in the liquid body.

More particularly, as described in the aforementioned U.S. Provisional Patent Application Ser. No. 60/578,767, filed Jun. 10, 2004 by William R. Campion for PRO-ACT MICROBIAL MANURE TREATMENT SYSTEM, in some circumstances the standing body of waste liquid may be subjected to a complex treatment system which "divides" the liquid into several different strata, each of which may undergo a different treatment regimen. By way of example but not limitation, in a manure pond, it may be desirable to provide a three strata treatment system: (i) a bottom anaerobic layer; (ii) an intermediate facultative layer; and (iii) a top aerobic layer. In such a system, it is generally desirable for the three layers to remain relatively segregated, and for only the top aerobic layer to be aerated. This may be further complicated inasmuch as in such a system, the top aerobic layer may be of variable thicknesses and, in some cases, may be relatively thin, e.g., only 6-12 inches thick.

As a result, using commercially-available propellers and rotors to effect aeration can present a problem, since the substantial agitation associated with propellers and rotors can cause the various layers of the liquid to mix. More particularly, while moderate intra-layer mixing of the liquid body may help the microorganisms to come into contact with the dissolved and suspended organic matter, intense inter-layer mixing of the liquid body is generally undesirable, since it disrupts the stratification of the liquid body, thereby making it more difficult to apply a separate treatment regimen to each layer of the liquid body. In addition, such intense inter-layer mixing of the liquid body is undesirable, since it adds oxygen to the lower facultative or anaerobic layers of the liquid.

In an effort to avoid the inter-layer mixing caused by the use of propellers and rotors, some systems replace the propellers and rotors with air diffusers placed on the floor of the lagoon. Unfortunately, while these air diffusers create less agitation than the aforementioned propellers and rotors, thereby minimizing undesirable inter-layer mixing, they also add oxygen to the lowest level in the lagoon, i.e., the anaerobic layer, which is precisely the layer which should not be oxygenated. Again, as noted above, adding oxygen to the anaerobic and facultative layers in the lower strata of the liquid body is generally undesirable. Furthermore, the oxygen from air diffusers placed on the floor of the lagoon only reaches the top target layer (i.e., the aerobic layer) after passing through the intervening anaerobic and facultative layers, which can reduce system effectiveness.

SUMMARY OF THE INVENTION

The present invention addresses the aforementioned problems by providing a novel method and apparatus for aerating a surface layer in a stratified liquid body. More particularly, the present invention provides a novel, depth-adjustable, fine bubble, surface layer aeration unit which is designed to add oxygen to only the top layer of the fluid body, without aerating a lower layer of the fluid body or causing substantial inter-layer mixing of the fluid body. Among other things, the novel aeration unit can be adjusted to maintain a desired depth level in the liquid body, so that the desired layer can be precisely targeted, and the unit is adapted to add oxygen to the target layer using fine bubble air diffusers which provide sufficiently vigorous but not excessive agitation of the target layer.

In one preferred form of the invention, there is provided a depth-adjustable, fine bubble, surface layer aeration unit comprising:
  a body comprising at least one hollow internal structure;
  an air inlet communicating with the at least one hollow internal structure, whereby air from an external air source may be introduced into the at least one hollow internal structure;
  at least one fine bubble aerator communicating with the at least one hollow internal structure, whereby air from the at least one hollow internal structure may be released through the at least one fine bubble aerator into an adjacent fluid; and
  at least one weight pod attached to the body, wherein the at least one weight pod comprises structure for adjusting the weight of the at least one weight pod, whereby the buoyancy of the aeration unit may be adjusted so as to permit the at least one fine bubble aerator to be positioned at a desired depth in a fluid body.

In another preferred form of the invention, there is provided a method for aerating a surface layer in a stratified liquid body, comprising:
  providing a depth-adjustable, fine bubble, surface layer aeration unit comprising:

a body comprising at least one hollow internal structure;
an air inlet communicating with the at least one hollow internal structure, whereby air from an external air source may be introduced into the at least one hollow internal structure;
at least one fine bubble aerator communicating with the at least one hollow internal structure, whereby air from the at least one hollow internal structure may be released through the at least one fine bubble aerator into an adjacent fluid; and
at least one weight pod attached to the body, wherein the at least one weight pod comprises structure for adjusting the weight of the at least one weight pod, whereby the buoyancy of the aeration unit may be adjusted so as to permit the at least one fine bubble aerator to be positioned at a desired depth in a fluid body;
connecting an air source to the air inlet, and positioning the unit in a fluid body; and
adjusting the weight of the at least one weight pod, so as to position the at least one fine bubble aerator within the surface layer of the stratified liquid body.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIGS. 6-17 show how the novel aeration unit may be packaged for shipping and then set up for use.

DETAILED DESCRIPTION OF THE PREFERRED EMBODIMENTS

The present invention provides a novel, depth-adjustable, fine bubble, surface layer aeration unit for aerating a surface layer in a stratified liquid body.

Figure 1:
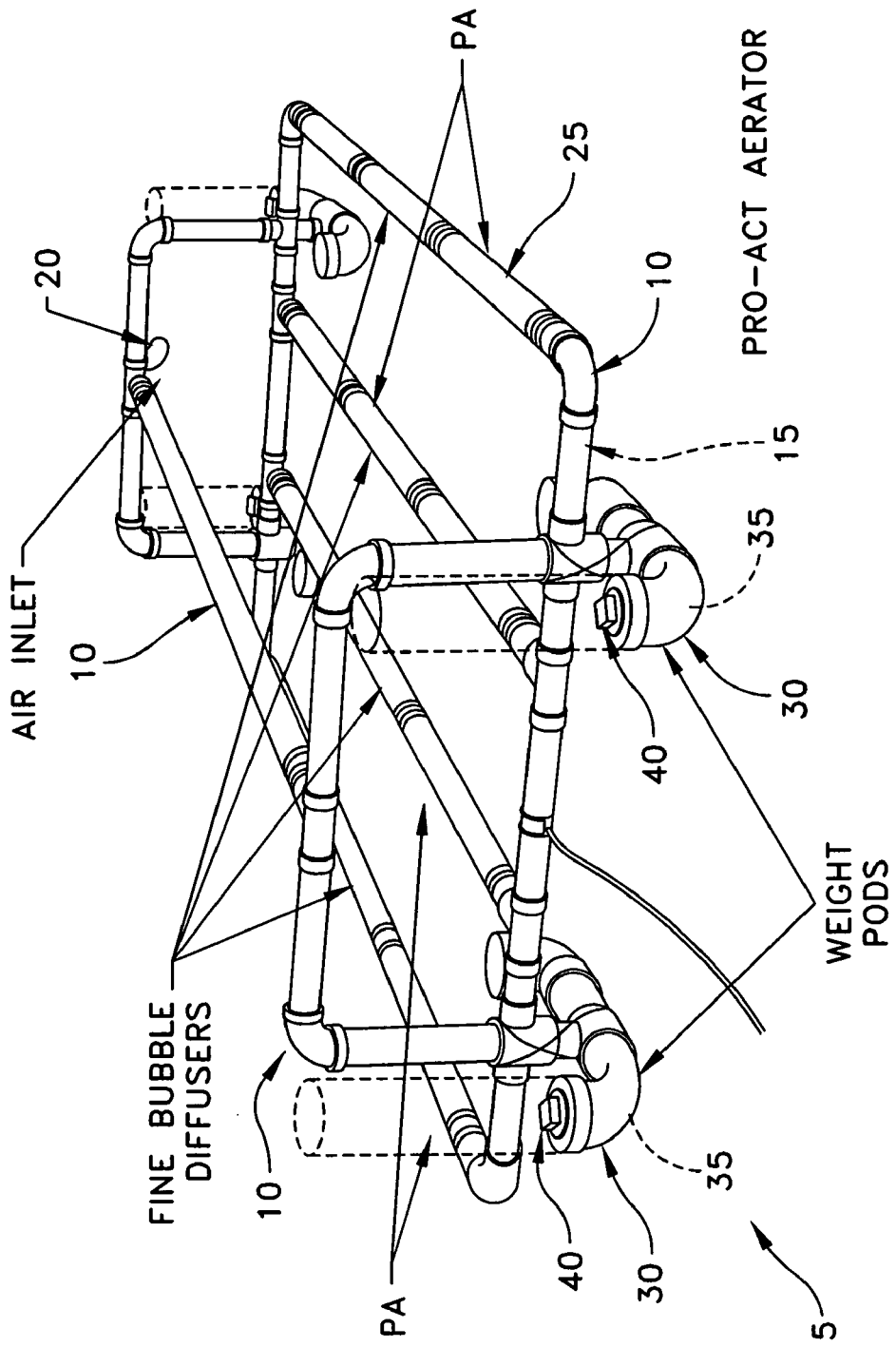
FIG. 1 is a perspective view of one preferred form of the novel, depth-adjustable, fine bubble, surface layer aeration unit.
Figure 2:
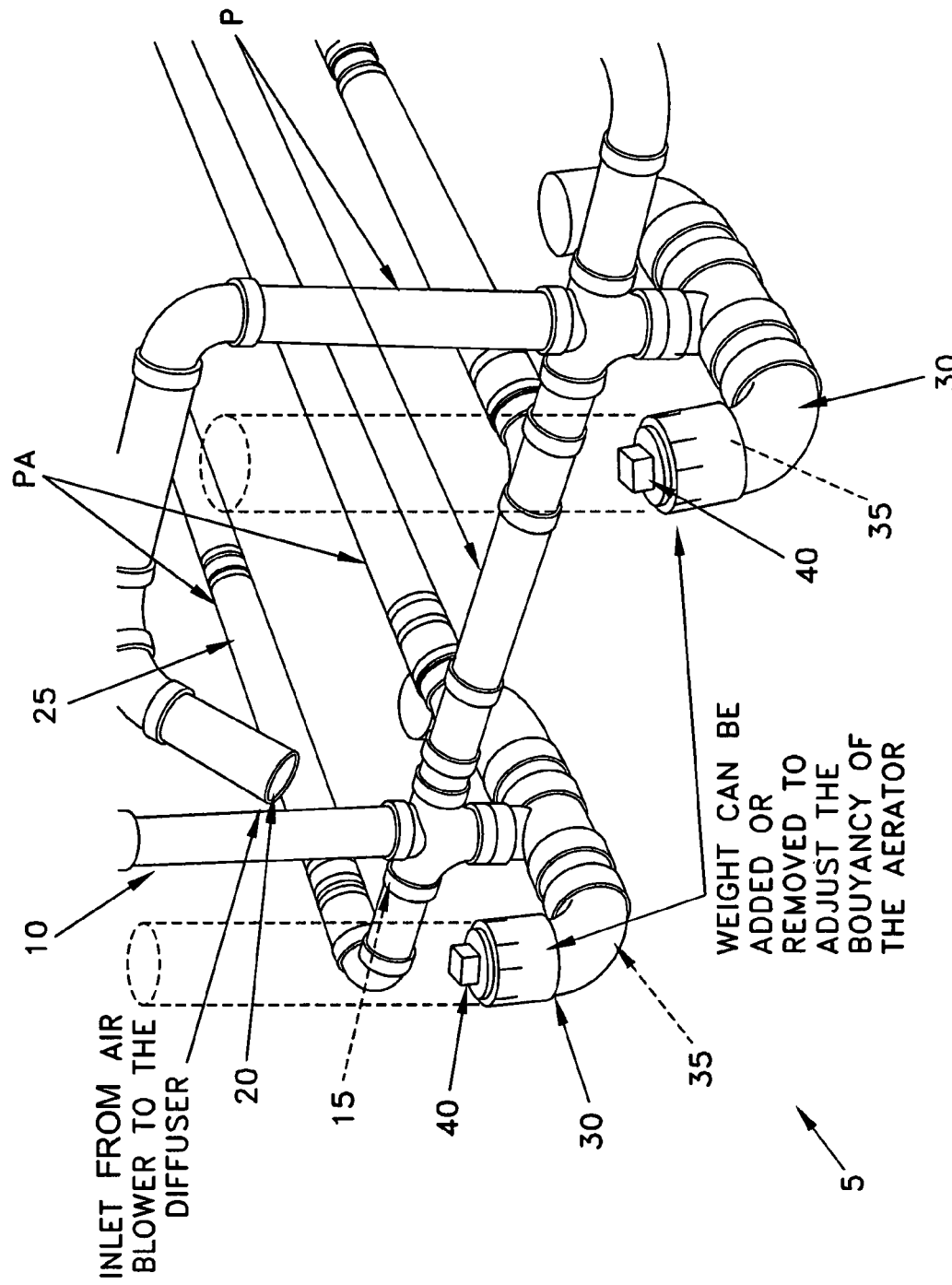
FIG. 2 is an enlarged view of selected portions of the same aeration unit, illustrating further details of the construction.

In one preferred form of the invention, and looking now at FIGS. 1 and 2, the novel, depth-adjustable, fine bubble, surface layer aeration unit comprises an aeration unit 5. Aeration unit 5 generally comprises a body 10 formed by a plurality of connected pipes P so as to define one or more hollow internal structures 15. By way of example but not limitation, hollow internal structures 15 may comprise the hollow interiors of the interconnected pipes P; alternatively, hollow internal structures 15 may comprise other chambers or cavities or passageways formed in or about body 10. Body 10 also comprises an air inlet 20 communicating with the one or more hollow internal structures 15, whereby air from an external air source (not shown in FIGS. 1 and 2) can be introduced into the one or more hollow internal structures 15. Body 10 also comprises one or more aeration pipes PA communicating with the one or more hollow internal structures 15, whereby air from the one or more hollow internal structures 15 can be released through holes (not shown) in the sidewalls of the aeration pipes PA and into an adjacent fluid when aeration pipes PA are positioned in a target liquid. Aeration pipes PA are provided with air diffusers 25 for releasing air in a controlled, fine bubble fashion from the interior of the aeration pipe PA.

Aeration unit 5 also comprises weight pods 30 attached to body 10. Weight pods 30 include means for adjusting their weight. In one preferred construction, weight pods 30 comprises one or more internal chambers 35 for receiving or removing weight material, i.e., ballast. Internal chambers 35 are accessed by removable caps 40. Removable caps 40 enable additional weight to be added to, or subtracted from, weight pods 30, thereby allowing the buoyancy of the aeration unit 5 to be adjusted, whereby to facilitate the precise positioning of the aeration pipes PA relative to a liquid layer. For convenience, weight pods 30 are preferably constructed so that the removable caps 40 are positioned above the surface of the fluid in which aeration unit 5 is floating, so that the buoyancy of aeration unit 5 can be adjusted in-situ. In FIGS. 1 and 2, selected portions of weight pods 30 are shown in phantom to illustrate how the height of removable caps 40 may be varied relative to the level of aeration pipes PA, so as to provide convenient in-situ access to removable caps 40.

As seen in FIG. 1, body 10 of aeration unit 5 is preferably constructed from a combination of pipes P which are connected together to form a flowpath from air inlet 20 to the air diffusers 25 of aeration pipes PA. By way of example but not limitation, a combination of joined-together PVC pipes (e.g., 2" and/or 3" diameter pipes) can be used for such a construction. Alternatively body 10 may be constructed from molded plastic elements, molded resin units, components made of other materials that will hold air and provide a desired buoyancy to the structure, etc.

Aeration pipes PA preferably comprise a plurality of pipes PA arranged in a planar fashion, whereby to facilitate disposition in a substantially horizontal layer of fluid. Aeration pipes PA include openings (not shown) in their sidewalls for releasing air from the pipe. Air diffusers 25, in the form of thin, air permeable membranes, are positioned over the aforementioned openings in the aeration pipes PA. This construction allows air to escape in a controlled fashion through the membrane and then into the water, creating a relatively uniform dispersion of fine bubbles. This construction provides excellent intra-layer mixing of the liquid body so as to help the microorganisms come into contact with the dissolved and suspended organic matter, while avoiding undesirable inter-layer mixing of the liquid body, which disrupts the stratification of the liquid body and makes it difficult to apply a separate treatment regimen to each layer of the liquid body. The diffuser membranes used in air diffusers 25 are of the sort well known in the waste treatment industry. By way of example but not limitation, such diffuser membranes may comprise EPDM (or similar material) or polymer diffuser membranes.

It will be appreciated that aeration pipes PA, the apertures (not shown) in the sidewalls of the aeration pipes PA, and the air diffusers 25 all work together to form fine bubble aerators which release air from the one or more hollow internal structures 15 into an adjacent liquid body in the form of fine air bubbles.

As noted above, aeration unit 5 is preferably equipped with weight pods 30 comprising removable caps 40 that enable weight material (e.g., water) to be added to, or subtracted from, body 10. By adding or subtracting weight to the weight pods, the buoyancy of the aeration unit 5 is easily adjustable. The upward pressure exerted upon the air-filled aeration unit 5 by its host fluid, further augmented by the pressure caused by air being released through the air diffusers 25, can be accurately counterbalanced by adding an appropriate amount of weight material to the weight pods, thereby allowing precise positioning of the aeration pipes PA relative to the liquid layer which is to be aerated.

Such precise positioning of the aeration pipes PA, coupled with the fine bubble aeration provided by the air diffusers 25, allows aeration to be limited to only the liquid layers at (or above) the level of the aeration pipes PA. As a result, by carefully adjusting the buoyancy of aeration unit 5 so that the aeration pipes PA are disposed in a top aerobic layer of a manure lagoon, oxygen may be supplied to microbes located in the top aerobic layer of a liquid body without adding oxygen to the facultative or anaerobic layers in the lower substrates of the liquid body.

Figure 3:
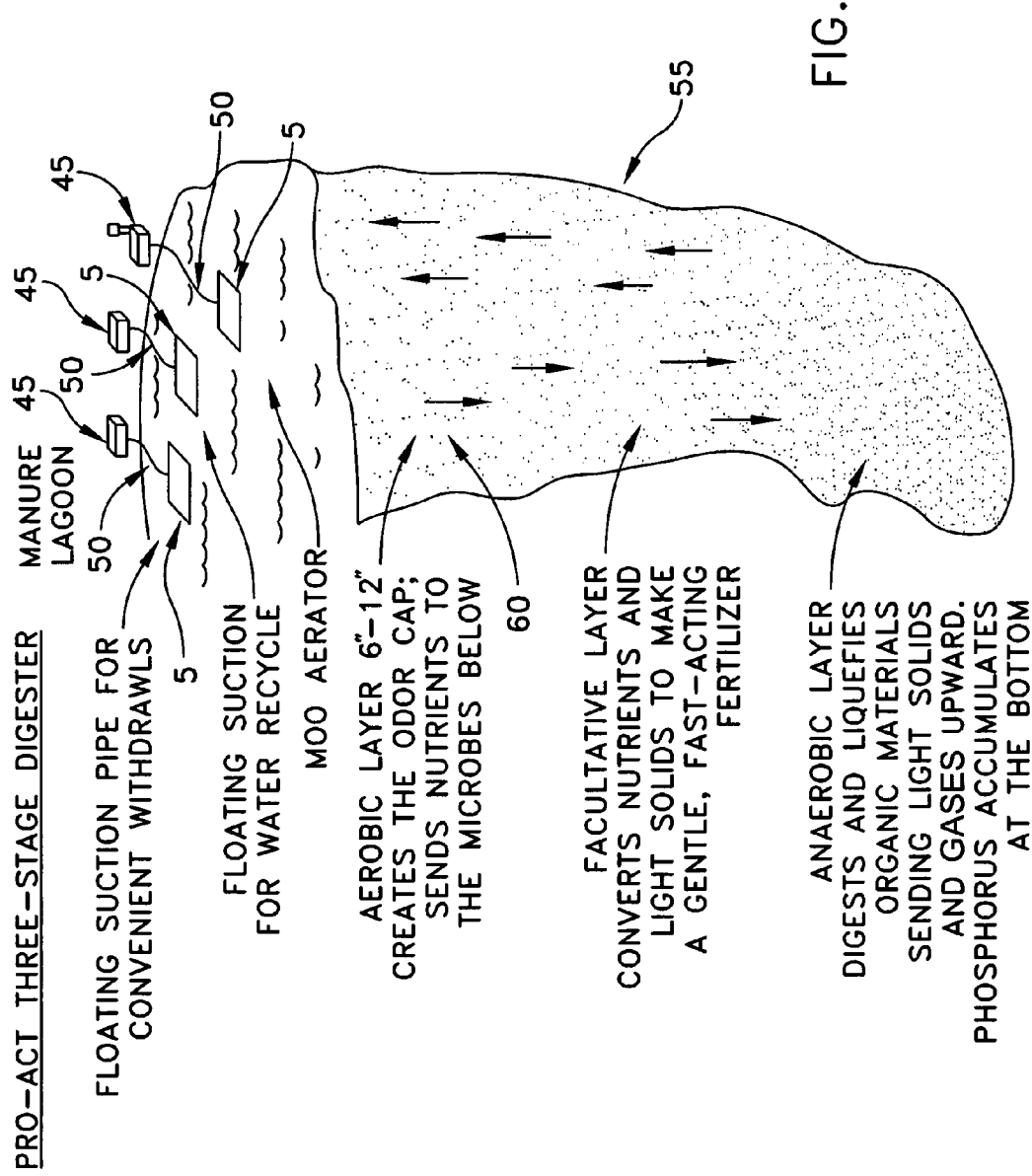
FIGS. 3-5 show the novel aeration unit in use.
Figure 4:
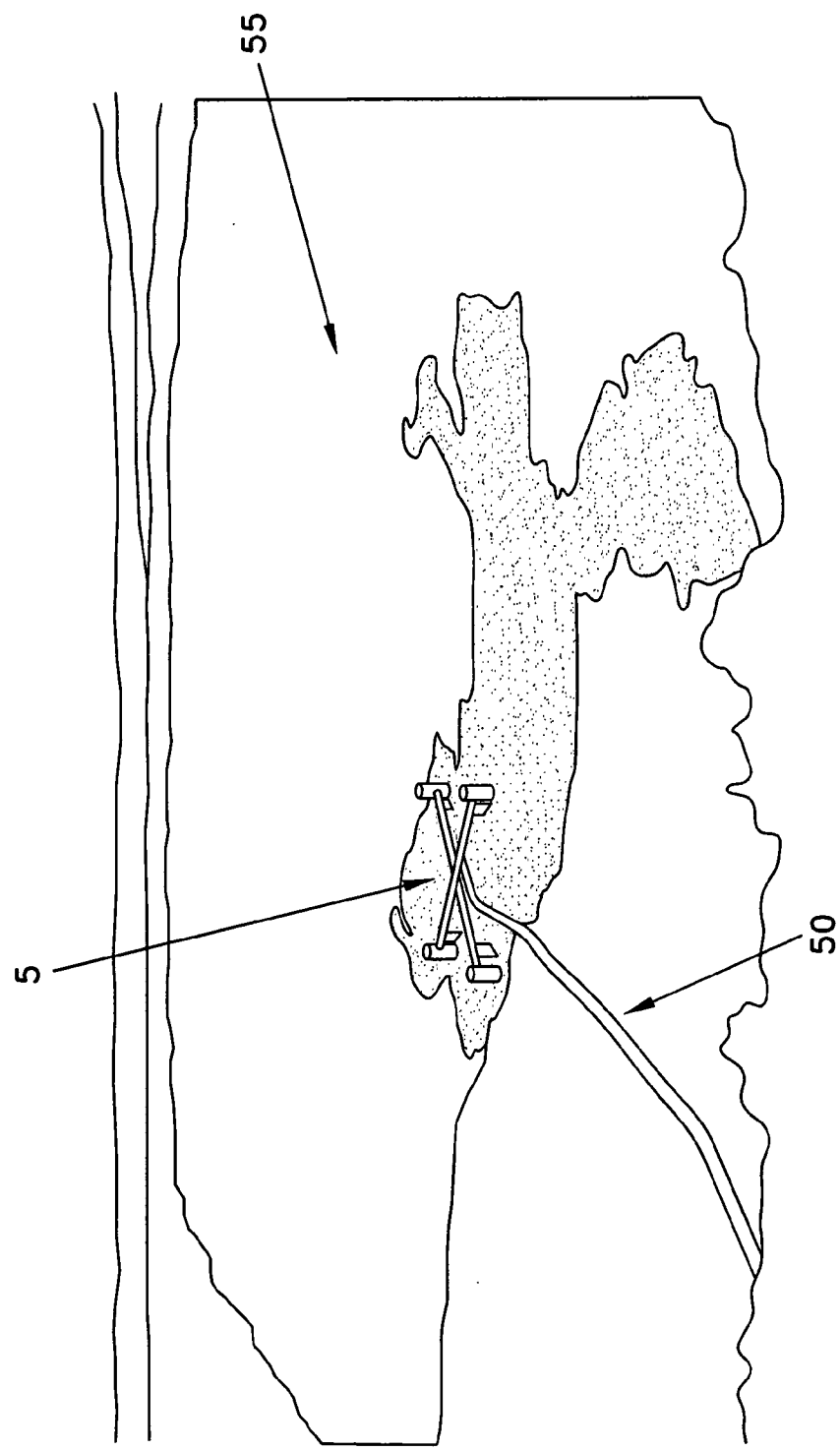
Figure 5:
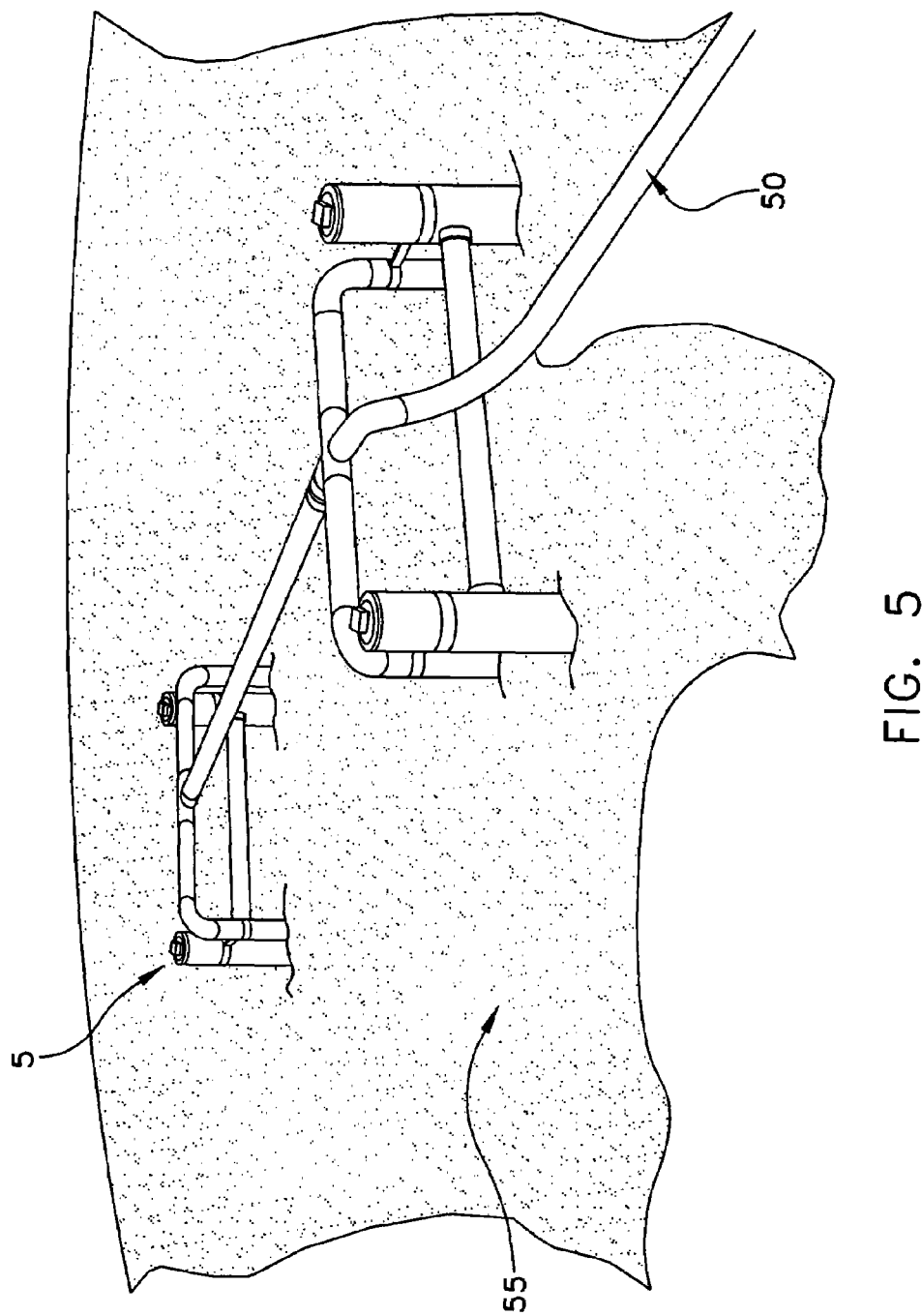
Figure 6:
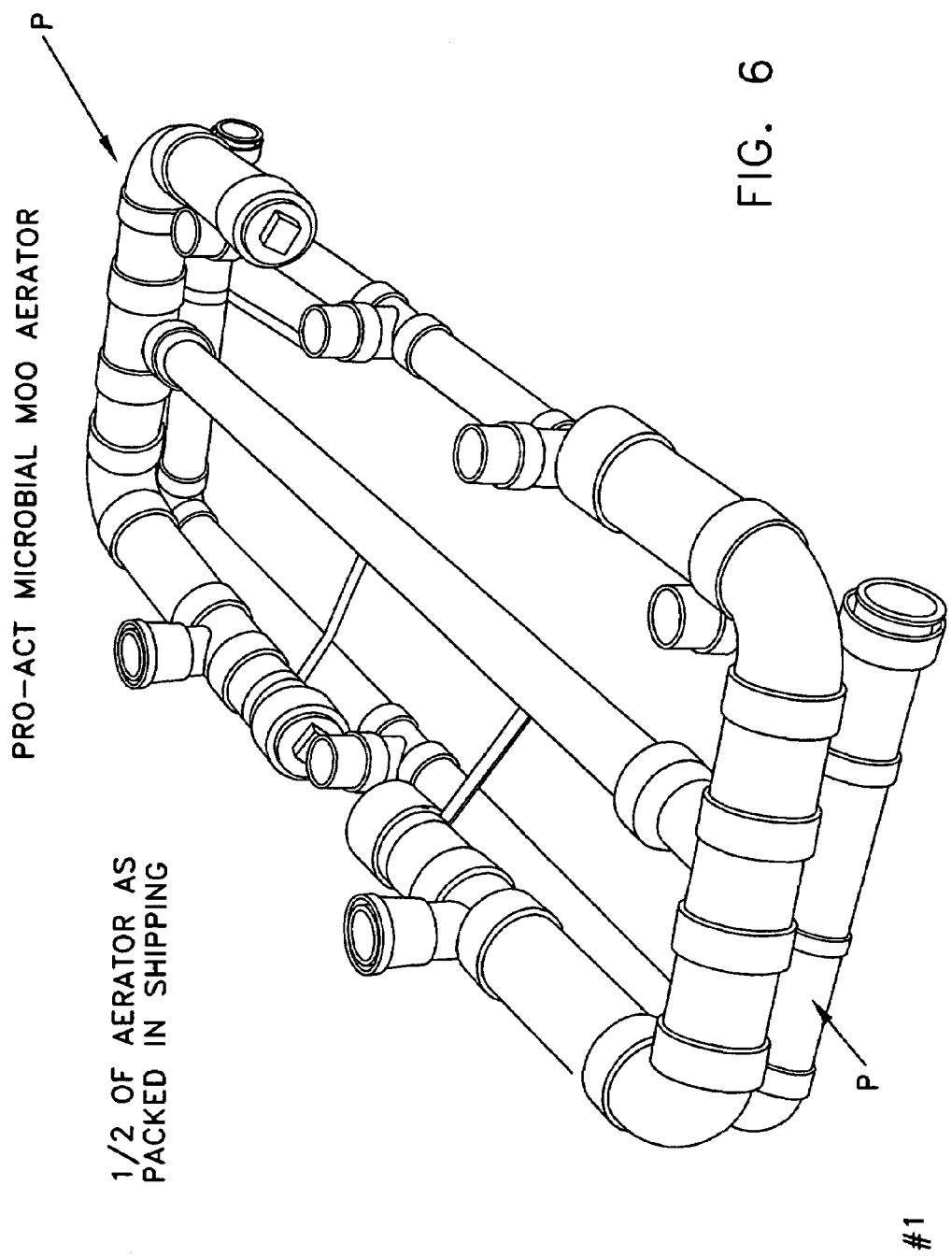
Figure 7:
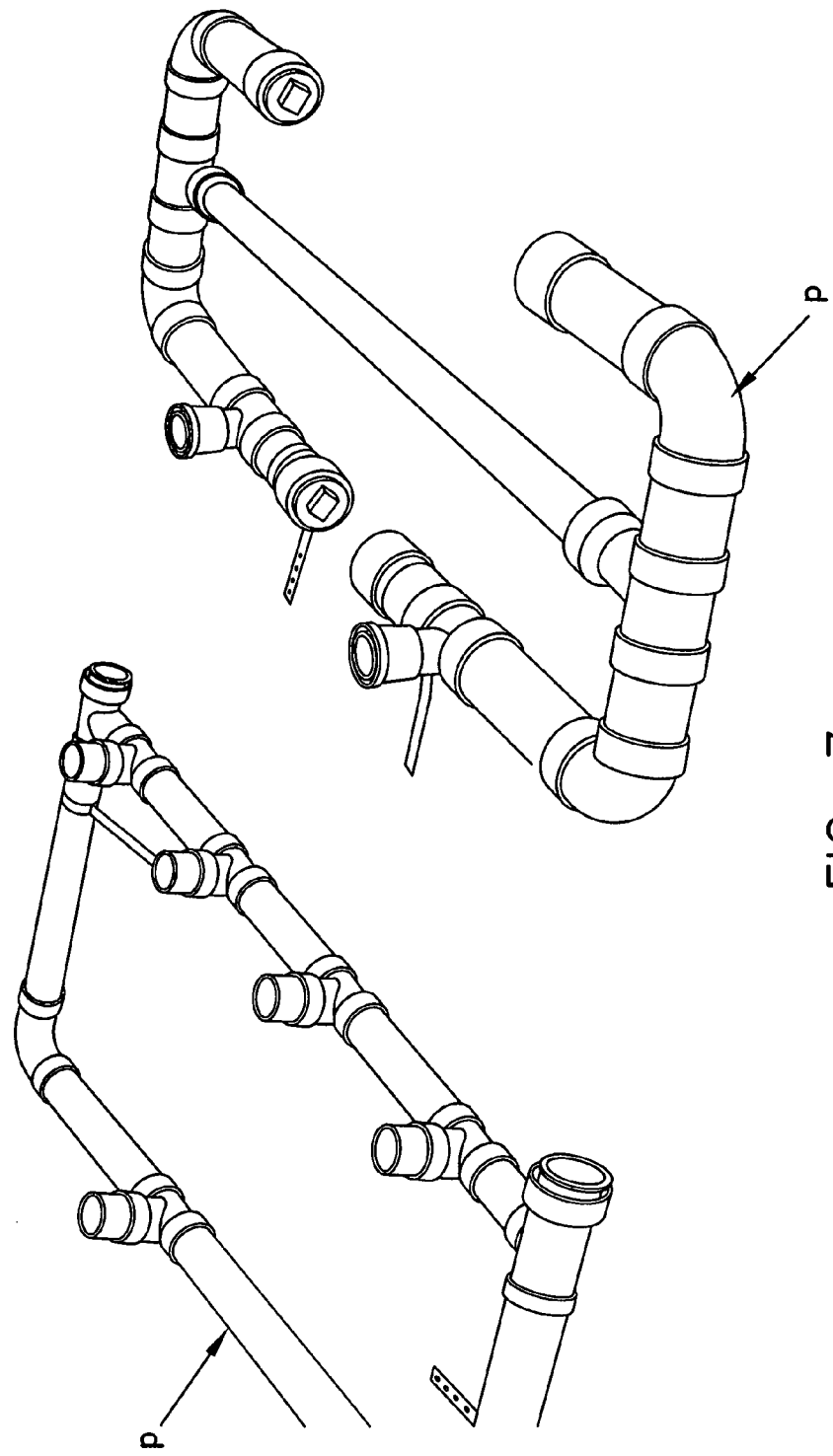
Figure 8:
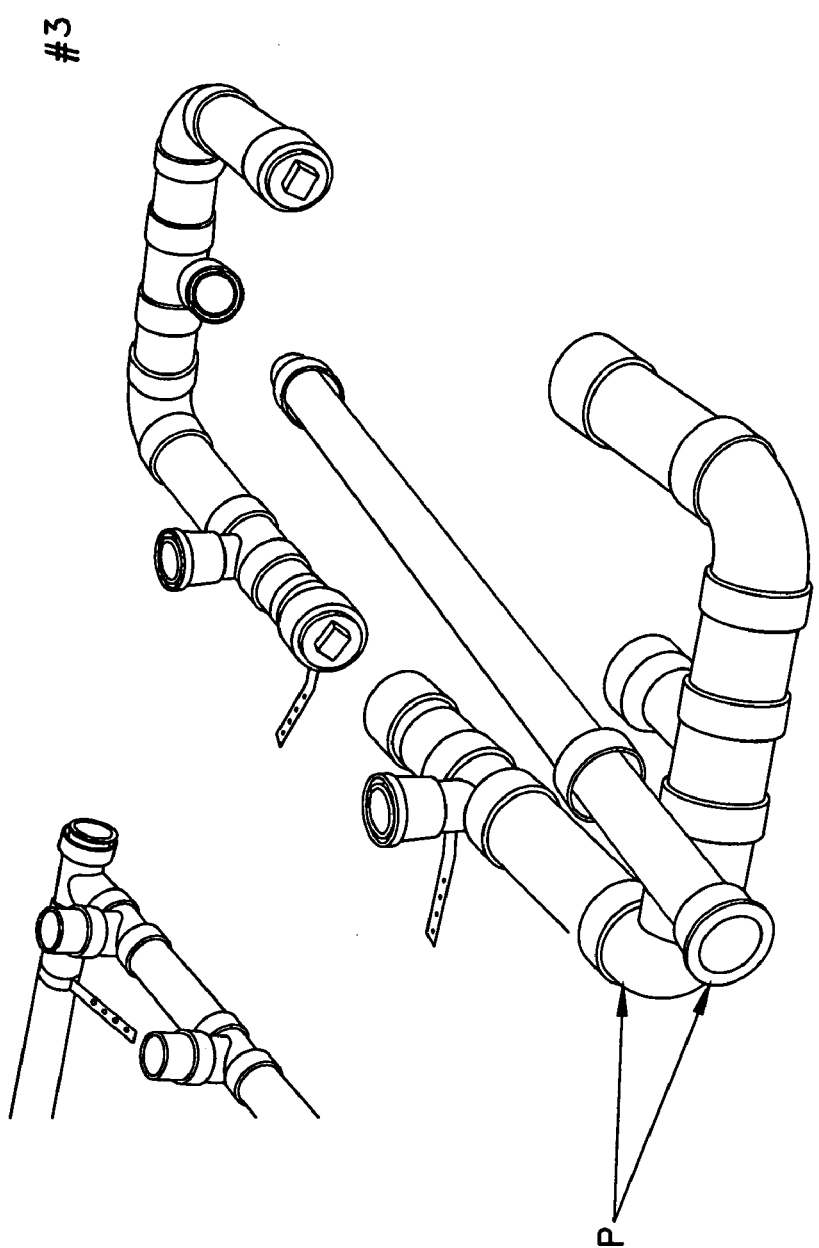
Figure 9:
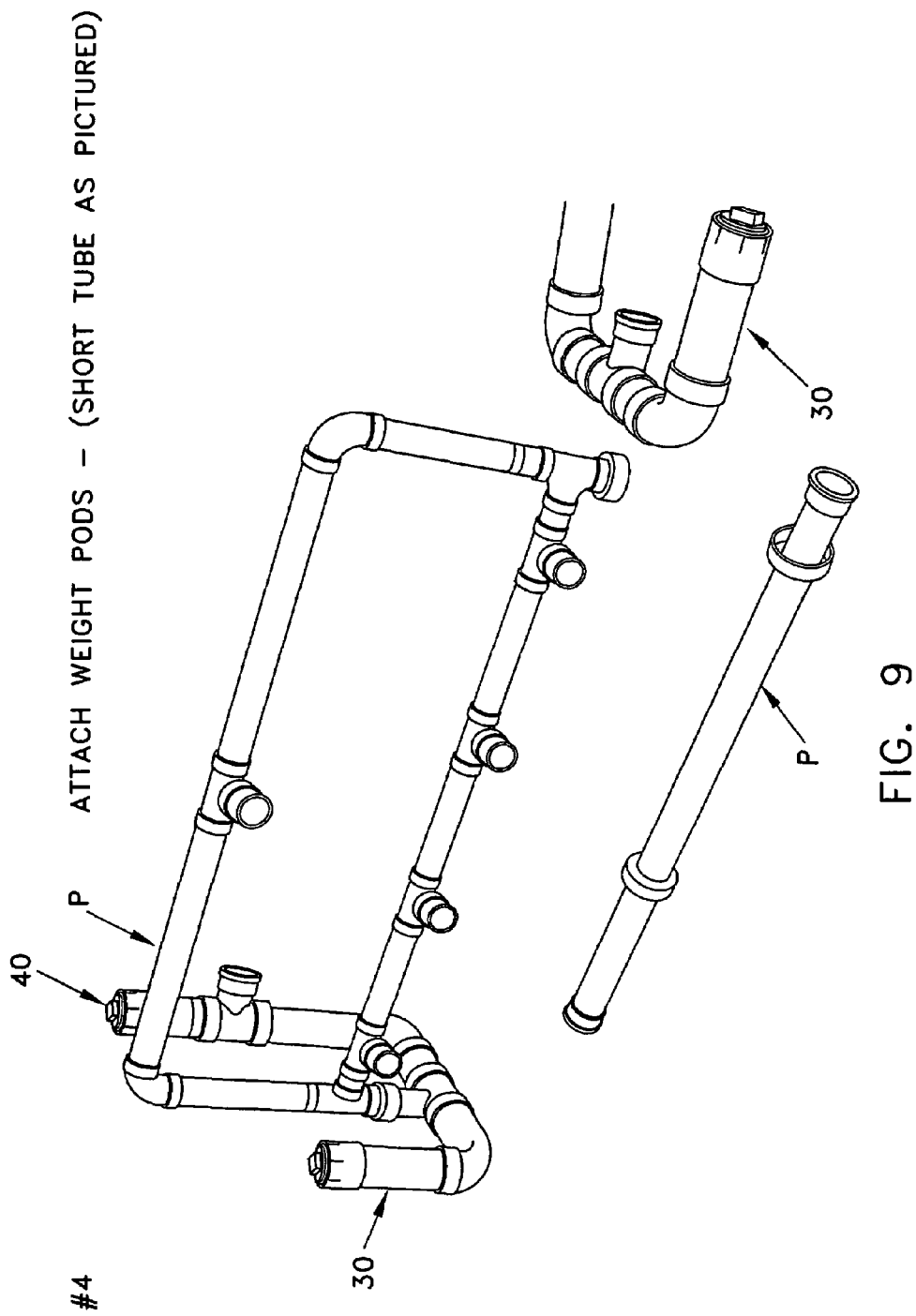
Figure 10:
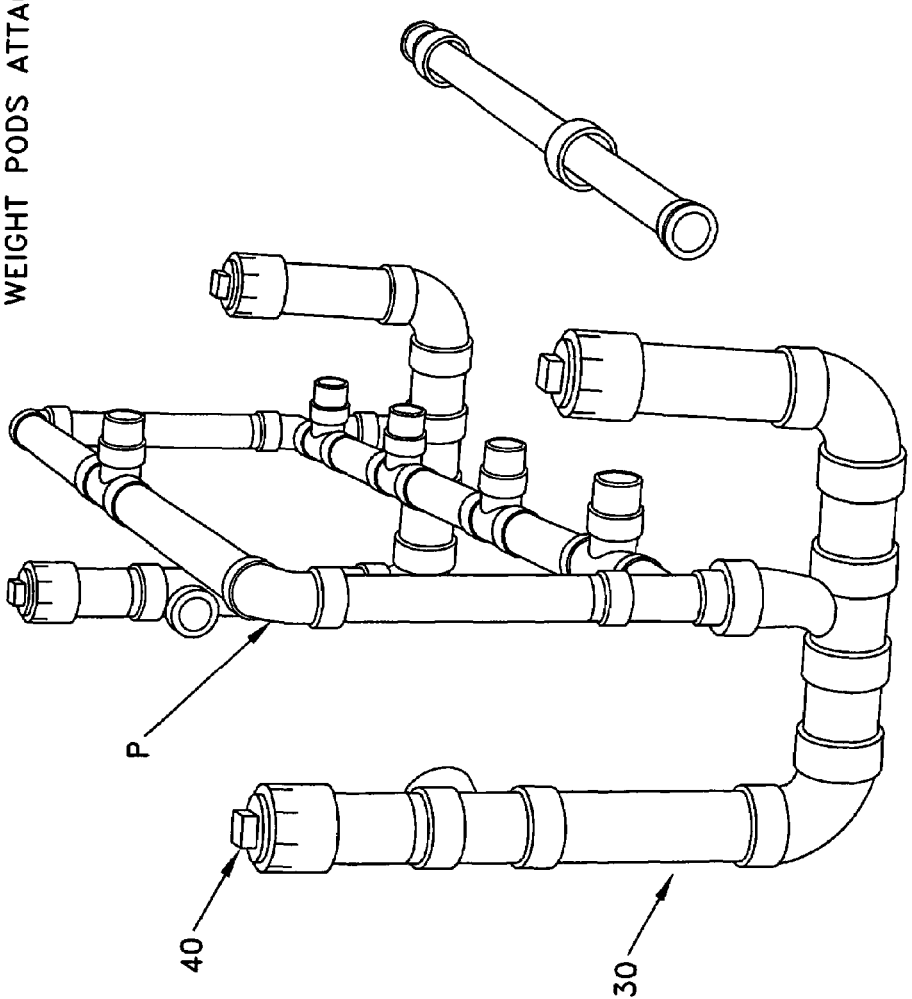
Figure 11:
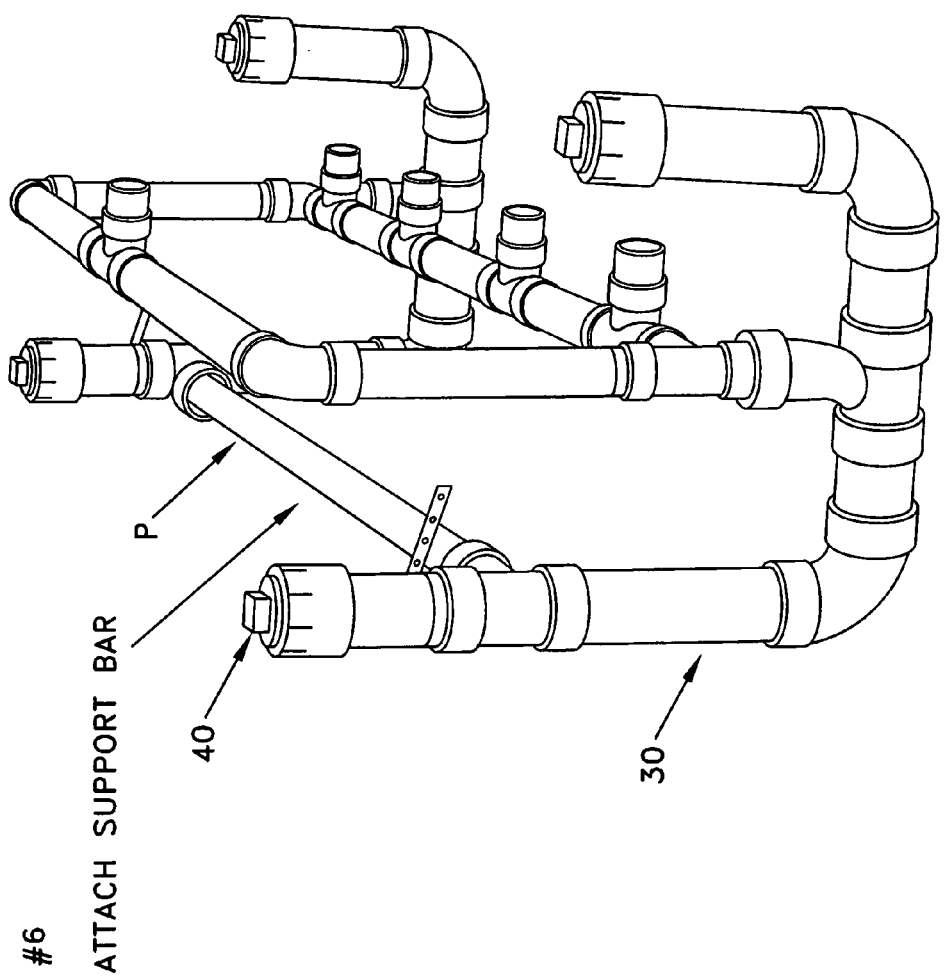
Figure 12:
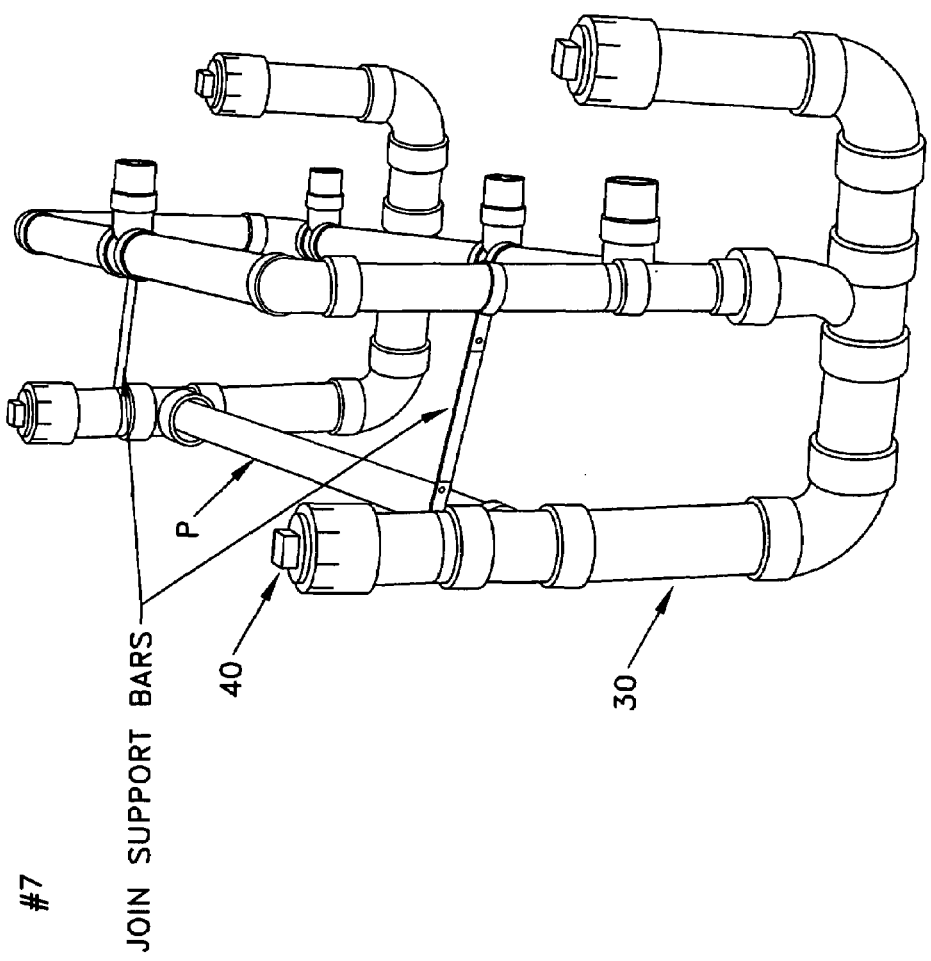
Figure 13:
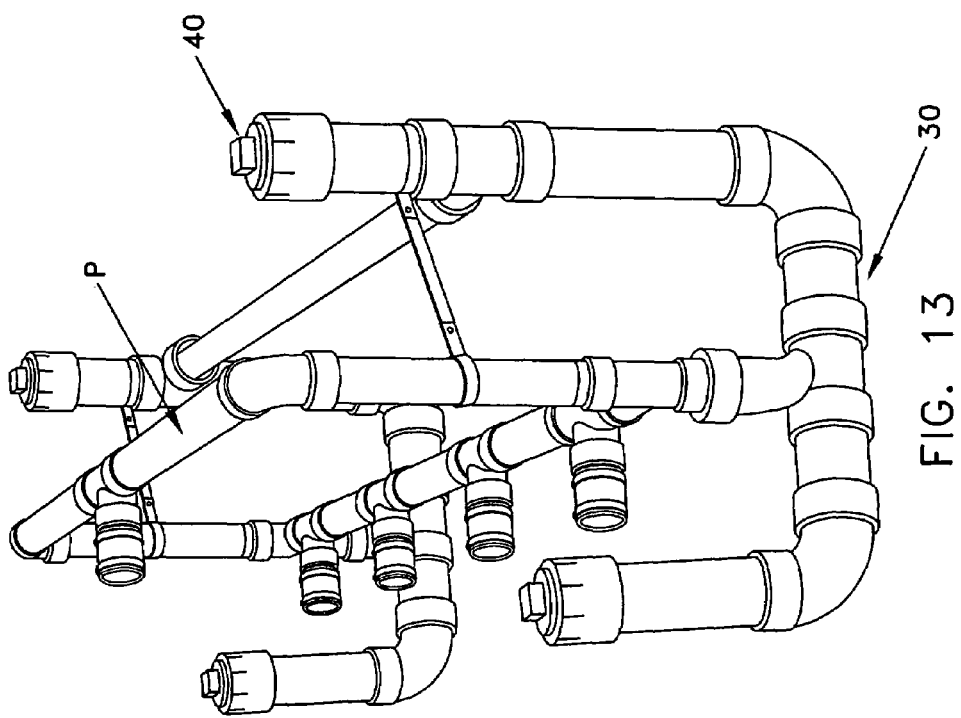
Figure 15:
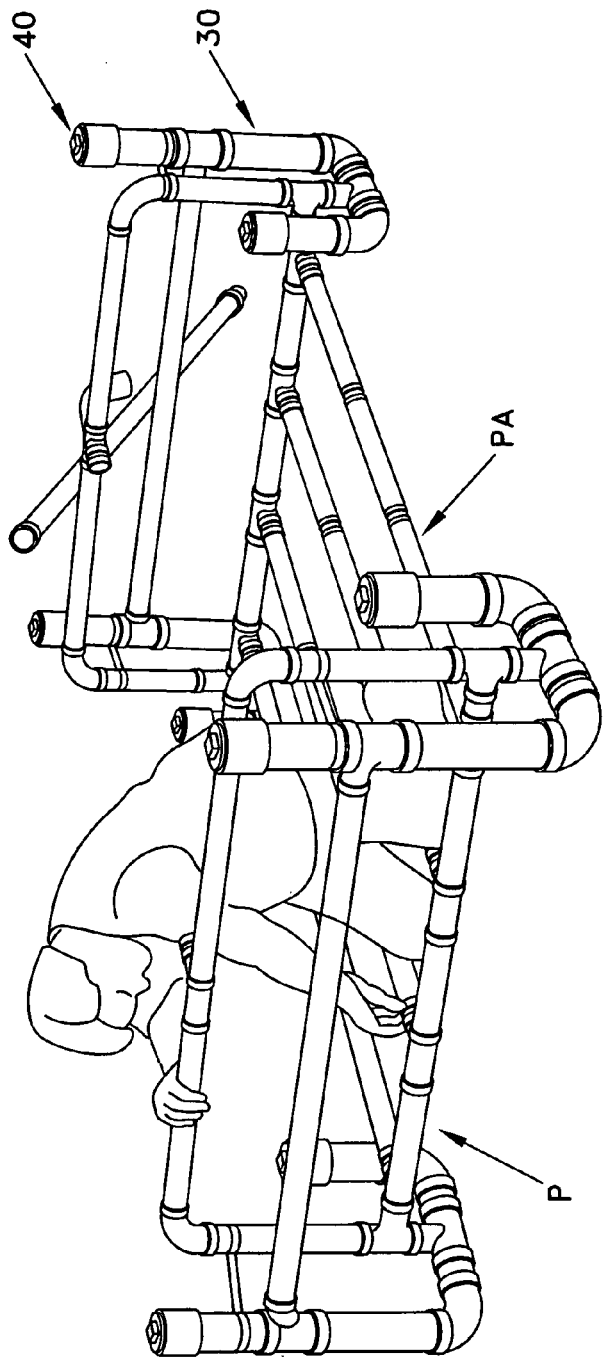
Figure 16:
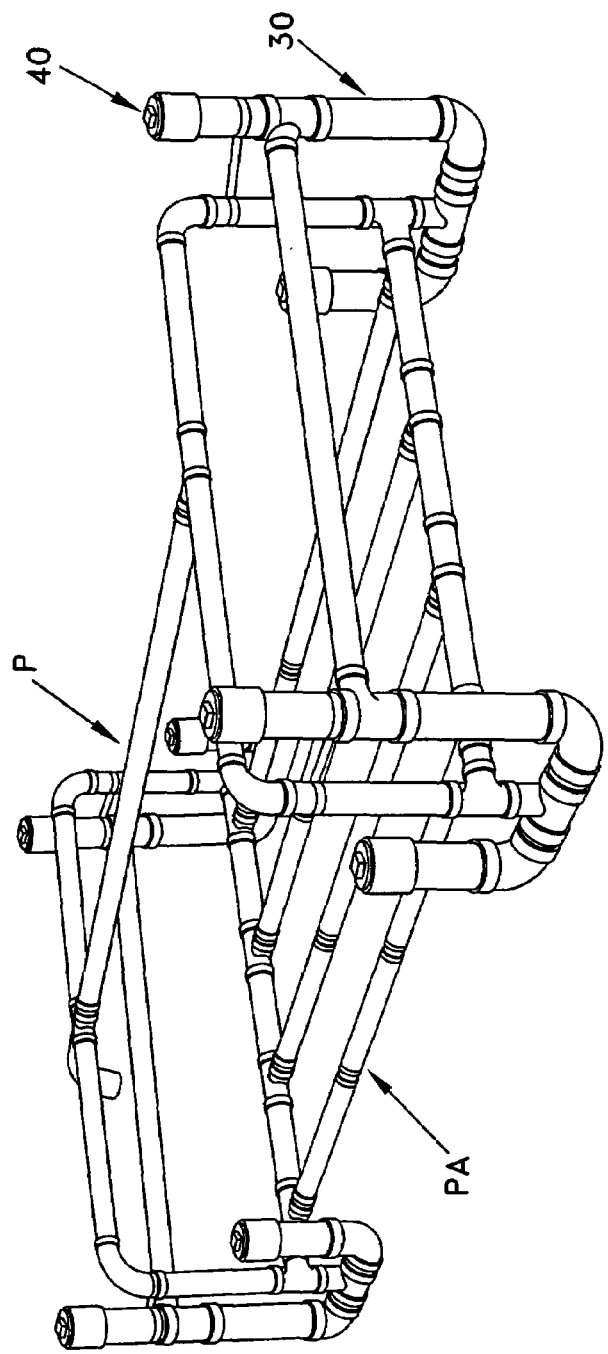
Figure 17:
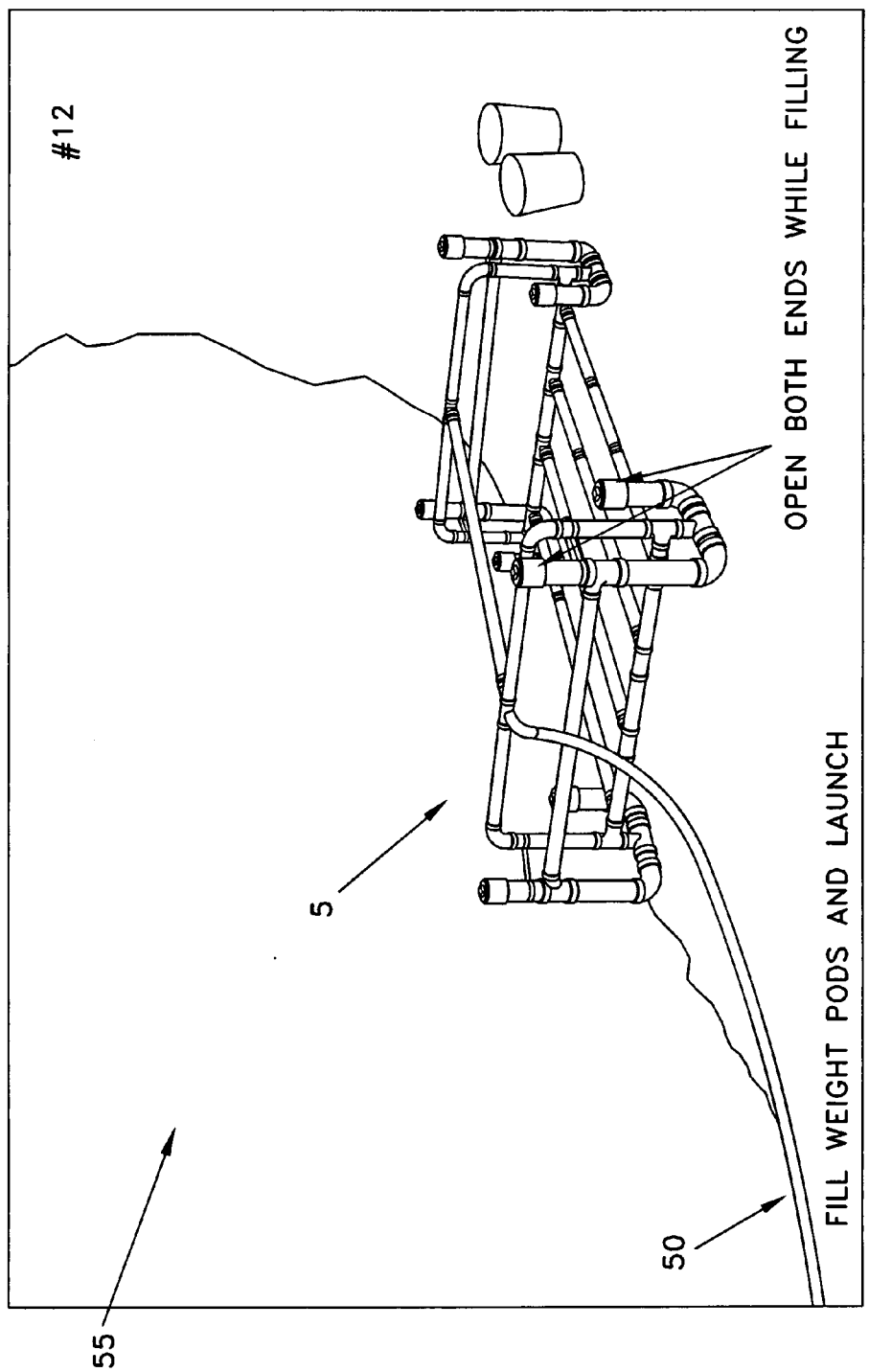

In one preferred form of use, and looking now at FIGS. 3-5, aeration unit 5 is connected to an air source 45 by a hose 50 and then positioned in a manure lagoon 55 (or the like). Using removable caps 40, the weight of weight pods 30 is then adjusted so as to establish the desired buoyancy for aeration unit 5, whereby aeration pipes PA (and hence air diffusers 25) will be located within a target layer in the fluid body, e.g., the top aerobic layer 60.

In one preferred embodiment of the present invention, aeration unit 5 may be made easily assembleable on-site, whereby to facilitate easy shipping to, and assembly at, a user location. Thus, in one form of the invention, aeration unit 5 may comprise various modules ready for assembly on-site. FIGS. 6-17 illustrate a series of steps showing how aeration unit 5 may be packaged for shipping and then assembled on-site.

It is to be understood that the present invention is by no means limited to the particular constructions herein disclosed and/or shown in the drawings, but also comprises any modifications or equivalents within the scope of the invention.

What is claimed is:

1. A method for aerating a particular stratum in a multi-stratum liquid body, wherein the multi-stratum liquid body comprises a lower anaerobic stratum comprising anaerobic microbes, an upper aerobic stratum comprising aerobic microbes, and an intermediate facultative stratum comprising facultative microbes, the method comprising:

providing a depth-adjustable, fine bubble, surface layer aeration unit comprising:

a body comprising at least one hollow internal structure;

an air inlet communicating with the at least one hollow internal structure, whereby air from an external air source may be introduced into the at least one hollow internal structure;

at least one fine bubble aerator communicating with the at least one hollow internal structure, whereby air from the at least one hollow internal structure may be released through the at least one fine bubble aerator into an adjacent fluid; and at least one weight pod attached to the body, wherein the at least one weight pod comprises structure for adjusting the weight of the at least one weight pod, whereby the buoyancy of the aeration unit may be adjusted so as to permit the at least one fine bubble aerator to be positioned at a desired depth in a fluid body;

connecting an air source to the air inlet, and positioning the aeration unit in the multi-stratum liquid body;

adjusting the weight of the at least one weight pod, so as to position the at least one fine bubble aerator entirely within, but only within, the upper aerobic stratum of the multi-stratum liquid body; and passing air into the air inlet and out of the at least one fine bubble aerator so as to aerate the upper aerobic stratum without aerating the lower anaerobic stratum and the intermediate facultative stratum.

2. A unit according to claim 1 wherein the body comprises a plurality of hollow pipes connected to one another.

3. A unit according to claim 2 wherein the at least one hollow internal structure comprises at least one interior of the plurality of hollow pipes.

4. A unit according to claim 1 wherein the at least one fine bubble aerator comprises at least one aperture in the body, wherein the at least one aperture communicates with the at least one hollow internal structure.

5. A unit according to claim 4 wherein the at least one fine bubble aerator further comprises at least one air permeable membrane disposed outboard of the at least one aperture, whereby air passing from the at least one aperture into the fluid must pass through the at least one air permeable membrane.

6. A unit according to claim 5 wherein the at least one air permeable membrane comprises an EPDM membrane.

7. A unit according to claim 5 wherein the at least one air permeable membrane comprises a polymer membrane.

8. A unit according to claim 1 wherein the aeration unit comprises a plurality of elongated fine bubble aerators arranged in a planar configuration.

9. A unit according to claim 1 wherein the at least one weight pod comprises at least one internal chamber for receiving weight material so as to adjust the weight of the at least one weight pod.

10. A unit according to claim 9 wherein the at least one weight pod comprises at least one removable cap for accessing the at least one internal chamber.

11. A unit according to claim 10 wherein the at least one removable cap is vertically displaced from the at least one fine bubble aerator, whereby the at least one removable cap will reside above the top surface of a fluid when the at least one fine bubble aerator is disposed in the fluid.

* * * * *